United States Patent [19]

Teijeiro

[11] 4,092,435
[45] May 30, 1978

[54] SHRIMP PRODUCT AND PROCESS

[75] Inventor: Joseph M. Teijeiro, Miami, Fla.

[73] Assignee: JTX Systems, Inc., N. Miami Beach, Fla.

[21] Appl. No.: 593,479

[22] Filed: Jul. 7, 1975

[51] Int. Cl.$^2$ ................................................. A23P 1/00
[52] U.S. Cl. ................................. 426/296; 426/643; 426/516
[58] Field of Search ................. 426/92, 296, 305, 438, 426/513, 643, 646, 533, 534, 516, 648, 650

[56] References Cited
U.S. PATENT DOCUMENTS

| | | | |
|---|---|---|---|
| 3,615,686 | 10/1971 | Marshall | 426/305 |
| 3,904,776 | 9/1975 | Magnino et al. | 426/643 |

OTHER PUBLICATIONS

Furia, "Handbook of Food Additives," The Chemical Rubber Company Publishers, pp. 467–468, 1968.
Coulson, "The Good Housekeeping Cookbook," Good Housekeeping Books Publishers, New York, NY, 1974, pp. 240, 242, 243 & 245.

*Primary Examiner*—R. B. Penland
*Attorney, Agent, or Firm*—Joseph Zallen

[57] ABSTRACT

A new shrimp product resembling large, whole shrimp in appearance, taste, texture and mouthfeel, made by mixing peeled and decapitated small shrimp with lemon juice, sodium tripolyphosphate, monosodium glutamate, flaking, blending, extruding, and either battering, breading, partially frying and quick freezing or boiling and quick freezing, with no binder or filler added in either case.

9 Claims, No Drawings

SHRIMP PRODUCT AND PROCESS

BACKGROUND OF THE INVENTION

This invention relates to a commercial product resembling large, whole peeled and decapitated shrimp and a process for its preparation. In particular, it relates to a breaded or boiled shrimp product having an appearance, taste, texture and mouthfeel closely resembling that of breaded or boiled whole shrimp.

Shrimp is such a perishable product that it can not be handled in large quantities commercially without being processed to some extent. However, various processes that have hereto been used have changed the flavor and texture. Processes that have hereto been used have included freezing, after first dipping in a solution of polyphosphate to minimize the loss of moisture upon thawing of the frozen shrimp. Another described shrimp process involves chopping and dicing. Shrimp have also been freeze-dried and re-hydrated. Also, shrimp have been ground and then reformed with a binder or filler.

One object of the present invention is to provide a new edible shrimp product made from small shrimp in the shape of a large shrimp having an appearance, taste, texture and mouthfeel resembling that of whole, fresh shrimp. A further object of this invention is to provide such a shrimp product which is free of any added binder or filler.

SUMMARY OF INVENTION

The invention comprises generally a new edible shrimp product which is a coherent agglomerate of flaked shrimp, free of any binder or filler. One process for preparing this product includes the steps of beginning with a batch of frozen, peeled, deveined and decapitated small shrimp, as, for example, species Titi, having a count of 90 to 200 or more to the pound. The batch is then thawed and drained and steeped in an aqueous solution containing sodium tripolyphosphate, monosodiumglutamate and concentrated lemon juice. The shrimp is then fed into a high-speed flaking machine, as for example, Urschel Comitrol, Model 3600. The batch is then mixed, as for example, in a Hobart dough mixer, and transferred to an extruder as, for example, the Autoprod Extruder Shape Depositor. The extruded shrimp shapes are then either deposited into a double dip batter/breader assembly line, partially fried and then quick frozen or boiled and then quick frozen.

The resulting products are breaded or boiled shrimp shaped products consistent in size and quality comprising a coherent agglomerate of the flaked shrimp free of added binder or filler. When the breaded product is placed in a deep fat fryer, the resultant fried product has an appearance, taste, texture and "mouthfeel" almost identical to that of large, breaded, fried, whole shrimp. It has none of the inherent mealiness or cereal characteristics of previously described extruded breaded shrimp products with binders and fillers added. The boiled product can be used in place of whole, boiled shrimp in shrimp cocktail.

The products of this invention can also be made from a starting product that has already been treated with sodium tripolyphosphate. Further, the starting batch can also include smaller pieces of shrimp which are generally sold as "shrimp pieces."

SPECIFIC EXAMPLES OF INVENTION

EXAMPLE I

One hundred pounds of frozen, peeled and decapitated species Titi shrimp having a count of 90 to 200 or more to the pound are thawed and drained. The batch is then placed into an aqueous solution made up as follows:
5 lbs. of water
8 oz. concentrated lemon juice
5 oz. sodium tripolyphosphate
5 oz. monosodium glutamate The shrimp batch and solution are paddle blended together and the shrimp are then flaked; the mixture fed through an Urschel Comitrol 3600 high-speed flaker and then transferred into a Hobart mixer. After mixing for two minutes, the mixture is fed into an Autoprod Extruder which forms large shrimp shaped units. The units are then deposited on a double dip batter/breader assembly line, which feeds into a partial fryer followed by quick freezing. The finished product has a count of approximately 16 to 20 to the pound.

EXAMPLE II

The starting batch is frozen, peeled and decapitated species Titi shrimp having a 90 to 200 count or more to the pound which has been previously treated with sodium tripolyphosphate. The batch is thawed and drained and then placed in an aqueous solution comprising the following:
5 lbs. water
8 oz. concentrated lemon juice
5 oz. monosodium glutamate This is paddle blended for about one minute. The mixture is flaked, mixed, extruded, coated, partially fried and quick frozen in a similar manner as in Example I.

EXAMPLE III

The starting material comprises frozen shrimp pieces which have been treated with sodium tripolyphosphate. A 100 lb. batch is thawed and drained and treated in a similar manner as in Example II, except that moisture must be carefully controlled. If the shrimp pieces in the original batch are too wet, they should be less in proper proportion to shrimp which are less wet or which have not been treated with sodium tripolyphosphate.

EXAMPLE IV

The process of Example I is followed except that after the shrimp shaped units have been formed by the extruder, they are boiled for two minutes and then quick-frozen.

Examples I, II and III result in breaded coherent, shaped agglomerates of shrimp flakes free of any binder or filler. These breaded products, when placed in a deep fat fryer, provide a fried product which has appearance, taste, texture and "mouthfeel" almost identical to that of large, breaded, fried whole shrimp.

The product of Example IV is a coherent, shaped agglomerate of shrimp flakes free of any added binder or filler and resembling large, whole boiled shrimp in appearance, taste and texture. These boiled products of the present invention have a particular application in such products as shrimp cocktail.

I claim:

1. An edible shrimp product resembling whole shrimp in appearance, taste and texture, comprising a coherent, shaped agglomerate of shrimp flakes containing a small amount of sodium tripolyphosphate and being substantially free of any added binder or filler.

2. An edible shrimp product resembling whole shrimp in appearance, taste and texture, comprising a battered, breaded and partially fried coherent, shaped agglomerate of shrimp flakes containing a small amount of sodium tripolyphosphate and being substantially free of any added binder or filler.

3. An edible shrimp product resembling whole shrimp in appearance, taste and texture, comprising a cooked, coherent, shaped agglomerate of shrimp flakes containing a small amount of sodium tripolyphosphate and being substantially free of any added binder or filler.

4. The shrimp product of claim 1, containing a small amount of lemon juice.

5. The shrimp product of claim 1, containing a small amount of monosodium glutamate.

6. A process for making a shrimp product resembling whole shrimp in appearance, taste and texture comprising the steps of:
   (a) providing an aqueous mixture of unfrozen peeled and decapitated whole raw shrimp or raw shrimp pieces;
   (b) flaking said shrimp or shrimp pieces in said aqueous mixture;
   (c) remixing said aqueous mixture of flaked shrimp or shrimp pieces; and
   (d) shaping said flaked shrimp or shrimp pieces into coherent agglomerates resembling whole shrimp; said process being characterized in that substantially no added binder or filler is introduced or present.

7. The process of claim 6, wherein said aqueous mixture contains a small amount of lemon juice.

8. The process of claim 6, wherein said aqueous mixture contains a small amount of sodium tripolyphosphate.

9. The process of claim 6, wherein said aqueous mixture contains a small amount of monosodium glutamate.

* * * * *